United States Patent [19]

Thoese et al.

[11] Patent Number: 4,876,155

[45] Date of Patent: Oct. 24, 1989

[54] POLYESTER FILM

[75] Inventors: Klaus Thoese; Karl-Heinz Jung, both of Wiesbaden, Fed. Rep. of Germany

[73] Assignee: Hoechst Aktiengesellschaft, Frankfurt, Fed. Rep. of Germany

[21] Appl. No.: 133,486

[22] Filed: Dec. 15, 1987

[30] Foreign Application Priority Data

Dec. 16, 1986 [DE] Fed. Rep. of Germany ....... 3642848

[51] Int. Cl.$^4$ ........................ B32B 27/08; B32B 27/36
[52] U.S. Cl. ................................... 428/480; 428/482; 430/160; 430/162
[58] Field of Search ....................... 428/336, 480,482; 430/160, 162; 524/602, 603

[56] References Cited

U.S. PATENT DOCUMENTS

| | | | |
|---|---|---|---|
| 3,734,874 | 5/1973 | Kibler et al. | 524/603 |
| 4,252,885 | 2/1981 | McGrail et al. | 430/160 |
| 4,476,189 | 10/1984 | Posey et al. | 428/336 |

Primary Examiner—Thomas J. Herbert
Attorney, Agent, or Firm—Foley & Lardner, Schwartz, Jeffery, Schwaab, Mack, Blumenthal & Evans

[57] ABSTRACT

A polyester film which is provided with a permanent, antistatic coating on one surface, which coating is obtained by treating the biaxially stretch-oriented and heat-set film with an aqueous dispersion, containing at least one copolyester containing sulfonate groups, and at least one salt derived from an amino acid or a protein hydrolysate. The material can be used in the production of diazo duplicating films.

13 Claims, No Drawings

POLYESTER FILM

BACKGROUND OF THE INVENTION

The present invention relates to a biaxially stretch-oriented and heat-set polyester film which on at least one surface is provided with a coating in which a copolyester that includes sulfonate groups is contained.

The manufacture of copolyesters containing sulfonate groups and their use as constituents of coatings for plastic films are known (U.S. Pat. No. 3,563,942). They can be applied in the form of aqueous solutions or dispersions and are employed for layer supports or adhesion-promoting intermediate layers (German Patent No. 28 13 014). The copolyester coatings per se do not have an antistatic effect. They may be applied to the finished plastic film or during film manufacture (U.S. Pat. No. 4,476,189). Apart from their inferior adhesion properties, polyester films have the disadvantage that, despite their frequent use and wide field of applications, they charge up electrostatically to an undesirably high degree, like all plastics do.

In order to avoid this disadvantage it is known to add antistatic agents to the plastic materials or to provide them with a thin surface coating of an antistatic agent. When materials are treated according to the first-mentioned method, the antistatic effect which can be achieved is unsatisfactory or, if the added amount of antistatic agent is increased, their mechanical properties become clearly worse. When the materials are provided with superficial coatings, a more efficient prevention of electrostatic surface charge-up is possible. In most cases, the antistatic agents used are water-soluble, low molecular-weight or polymeric products. Thus, the applied coatings only possess a limited resistance to moisture or water, respectively. Moreover, these coatings are easily abraded mechanically, whereby their antistatic action is lost, or they get tacky when the films are heated.

If a combination of customary antistatic agents and binders is used, antistatic coatings exhibiting improved mechanical strength are obtained, but their antistatic effect is lost when water is allowed to act upon the film.

SUMMARY OF THE INVENTION

It is therefore an object of the present invention to provide an improved polyester film having an antistatic surface coating produced by treatment of the finished film with an aqueous dispersion.

It is also an object of the invention to provide such a polyester film wherein the dried coating is highly resistant to moisture and water.

Another object of the invention is to provide such a film which fully or at least substantially maintains its anti-electrostatic properties under mechanical strain.

Still another object of the invention is to provide a polyester film having a surface that does not become tacky upon being heated.

It is also an object of the invention to provide an improved diazotype duplicating film having an antistatic coating on its rear surface.

In accomplishing the foregoing objects, there has been provided according to one aspect of the present invention a biaxially stretch-oriented and heat-set polyester film having, on at least one surface, a coating comprising a copolyester containing sulfonate groups, wherein said coating comprises at least one salt derived from an amino acid or a protein hydrolysate.

In accordance with another aspect of the present invention there has been provided a diazotype duplicating film comprising a polyester film, as defined above, as the base material having the coating on the rear surface of the film, and a diazotype reproduction layer on the front surface of the film.

Further objects, features and advantages of the invention will become apparent from the detailed description of preferred embodiments that follows.

DETAILED DESCRIPTION OF THE PREFERRED EMBODIMENTS

The invention provides a biaxially stretch-oriented and heat-set polyester film which on at least one surface is provided with a coating comprising a copolyester that contains sulfonate groups. At least one salt derived from amino acids or protein hydrolysates, in particular a salt of N-acylsarcosine or a salt of an N-acyl derivative of protein hydrolysates is contained in the coating of the film. Preferably, the salt is present in the coating in an amount of from about 5 to 25 percent by weight, and particularly in an amount of from about 6 to 20 percent by weight.

The present invention makes available polyester films provided with an antistatic coating, which can, for example, be used as layer supports for photosensitive or electrophotographic recording materials, as films which can be marked, as mounting films, as cassette slip sheets or as video tape leader tapes, the antistatic effect of which is not lost due to the action of moisture, water, mechanical strain or heat.

Polyester films provided with the antistatic coatings according to this invention are preferably employed for diazo type duplicating films or for films on which an image can be produced by electrophotographic means, and which are processed at high temperatures. Even after processing, a permanent antistatic effect is maintained.

At least one surface of the polyester film according to the present invention is provided with a coating including a binder which is comprised of a copolyester that contains sulfonate groups and which is dispersible in water and in which at least one antistatic agent is embedded.

Substances which are commonly employed as surfactants have surprisingly proved to be good antistatic agents. They can be derived from amino acids. N-acylsarcosines, such as compounds of the fatty acid type, having lauryl, cocoyl, stearyl or oleyl groups, in the form of their ammonium, alkali metal or, for example, triethanolamine salts, have been found to be useful. The protein hydrolysates in the form of their salts, which are obtained from natural collagen and which are condensed with long-chain fatty acids, such as coconut fatty acid, are also suitable.

It is of great advantage that these substances are physiologically safe and are, for example, even employed in the cosmetics industry. Thus, users need not take any additional precautions to prevent environmental pollution during the processing of the substances.

Other antistatic agents either showed a less durable antistatic action or the amounts which had to be added were too high. In the case of some other antistatic agents, additional amounts of surfactants were required to achieve sufficient wetting of the polyester surface with the aqueous solution.

The sulfonate group-containing copolyesters employed in accordance with this invention are known, for example, from German Auslegeschrift No. 18 16 163 (equivalent to U.S. Pat. No. 3,734,874), German Patent No. 28 13 014 (equivalent to U.S. Pat. No. 4,252,885) or from U.S. Pat. No. 3,563,942, the disclosures of which are hereby incorporated by reference. The polyesters are essentially soluble or dispersible in water, and are obtained by reacting aliphatic, cycloaliphatic or aromatic dicarboxylic acids with aliphatic, cycloaliphatic or aromatic diols, whereby the esterifiable dicarboxylic acids or diols carry an —$SO_3M$ group on an aromatic ring, with M denoting a hydrogen or metal ion.

To improve the thermal stability of the coating, the glass transition temperature of the copolyesters employed is preferably as high as possible.

It has also been found advantageous to add crosslinking agents to the coating. The crosslinking agents preferably are commercially available formaldehyde compounds which are partially or completely etherified and derived from urea or melamine. Oligo-methoxymethylmelamines, such as hexamethoxymethylmelamine, have proved to be particularly useful compounds. The crosslinking agents are added to the coating solution in small amounts. The coating solutions have to be rendered acidic to achieve a sufficiently rapid crosslinking reaction.

Other thermally stable binders which can be processed as aqueous dispersions may also be added to the system. For this purpose, polymethylmethacrylate plastic dispersions are used to particular advantage. Particularly clear films are obtained when no second binder component is required.

The aqueous solutions can be applied by means of any application system which is able to produce sufficiently thin, homogeneous coatings. The dried antistatic coatings have weights of from about 0.05 to 3.0 g/m², depending on the particular use intended for the individual coated polyester film. The antistatic coatings can be applied as single-sided or double-sided coatings. This also depends on the use intended for the respective material.

The polyester films employed preferably are made from polyalkyleneterephthalate. This material is, in particular, used for diazo duplicating films comprising a polyethyleneterephthalate film support, the rear surface of which is provided with a permanently antistatic coating.

The coatings applied to the polyester films according to this invention may furthermore contain finely divided inorganic or organic substances which serve, for example, as slip agents or matting agents. The coatings can optionally be colored by means of dyes or pigments.

The invention will now be explained in greater detail by reference to the Examples which follow.

The following, commercially available, anionic products are employed as antistatic agents: fatty acid sarcosinate (sodium salt) (1); palm nut fatty acid sarcosinate (2); lauroyl sarcosinate (3); palm nut/coconut fatty acid sarcosinate (4); a mixture of mono-, di- and tri-(alkyltetraglycol ether)-o-phosphoric acid esters (5); and a coconut fat condensation product with protein, as a potassium salt (6). These substances are available from Hoechst AG under the tradenames ARKOMON®, MEDIALAN® and HOSTAPHAT®, and from Chemische Fabrik Gruenau under the tradename LAMEPON®.

The employed sulfonate group-containing copolyesters, which are, for example, available from Eastman Chemical Products Inc., are characterized by the following data:

| Name | Molecular Weight | Tg(° C.) | Hydroxyl Number | Acid Number |
| --- | --- | --- | --- | --- |
| AQ 29 | 14,000 | 29 | 6.0 | <2 |
| AQ 38 | 18,000 | 38 | 5.0 | <2 |
| AQ 55 | 18,000 | 55 | 5.3 | <2 |

EXAMPLE 1

A 100 μm thick, clear polyethylene terephthalate film, which had been oriented by biaxial stretching and heat-set was used as the base material. Coating was performed with the aid of a wire wound doctor. Wet films having a thickness of 12 μm each were obtained from solutions of the following compositions:

Basic solution, solids content 10%:
207 g:=of deionized water,
60 g:=of isopropyl alcohol, and
133 g:=of a 33% copolyester dispersion of AQ 55

Batches of this basic solution, which each weighed 25 g, were then mixed with 3 g of 5% strength aqueous solutions of one of the above-described antistatic agents.

The wet coatings were dried in a circulating air drying cabinet at 120° C. for 3 minutes. Clear, thin coatings were obtained, which were tested for adhesion, water-resistance, tendency to become tacky and surface resistance. Table 1 shows the results obtained with the coatings containing 6% of the antistatic agent.

TABLE 1

| Antistatic Agent | Adhesion | Water Resistance | Tackiness Test | Surface Resistance (ohm) |
| --- | --- | --- | --- | --- |
| — | poor | good | poor | >$10^{14}$ |
| (1) | good | substantially good | good | 7.0 × $10^{10}$ |
| (6) | good | substantially good | good | 6.5 × $10^{11}$ |
| (2) | good | good | good | 6.5 × $10^{10}$ |
| (4) | good | substantially good | good | 3.2 × $10^{10}$ |
| (5) | medium to good | substantially good | good | 5.5 × $10^{11}$ |
| (6) | good | substantially good | good | 9.0 × $10^9$ |

It was found that smeary, unusable surfaces were obtained when the concentration of (5) was increased.

TEST PROCEDURES

1. Adhesion of the Coating

The film is scratched by means of a criss-cross cut in accordance with DIN 53, 151. A strip of adhesive tape (TESABAND® 104 colorless) is pressed onto the scratched surface areas with the aid of the handle of a pair of scissors and is pulled off with a jerk. If the adhesion of the coating is good, no portions thereof must stick to the adhesive tape.

2. Water resistance

A drop of deionized water is wiped over the surface to be tested. A water-resistant coating will not be dissolved away.

3. Tackiness test

The film sample to be tested is introduced between a pair of heated rollers (85° C.) of a blueprint machine.

The test result is good if no markings are left on the antistatic coating.

4. Surface resistance

The samples are conditioned at about 23° C. and 50% relative humidity for 24 hours. The surface resistance is determined by means of spring reed electrodes in accordance with DIN 53,482. It is a measure for the antistatic action of the coating and should be less than to $1.0 \times 10^{12}$ ohm if the antistatic effect is to be classified as being good.

EXAMPLE 2

In accordance with Example 1, antistatic coatings were prepared from the following solutions:

I. 212 g of deionized water,
  60 g of isopropanol,
  133 g of a copolyester dispersion (30% strength) of AQ 29.
II. 185 g of deionized water,
  60 g of isopropyl alcohol,
  133 g of copolyester dispersion (25% strength) of AQ 38.
III. 212 g of deionized water,
  60 g of isopropyl alcohol,
  133 g of copolyester dispersion (30% strength) of AQ 55.

190 g of each of these solutions were mixed with 20 g of a 10% strength solution of a: (2) or b: (4). Thus, the coatings contained 10% of the antistatic admixture, which also acted as a surfactant. In all cases, clear coatings exhibiting excellent adhesion to the polyester film were obtained. The test results are compiled in Table 2.

TABLE 2

| Solution | Water Resistance | Tackiness Test | Surface Resistance (ohm) |
|---|---|---|---|
| Ia | substantially good | substantially good | $2.7 \times 10^{10}$ |
| Ib | substantially good | good | $6.5 \times 10^{10}$ |
| IIa | good | medium | $2.3 \times 10^{10}$ |
| IIb | substantially good | substantially good | $5.0 \times 10^{9}$ |
| IIIa | good | good | $8.0 \times 10^{9}$ |
| IIIb | substantially good | substantially good | $1.3 \times 10^{10}$ |

EXAMPLE 3

Antistatic coatings were prepared as described in Example 1. Solutions Ia to IIIb according to Example 2 additionally comprised hexamethoxymethylmelamine (CYMEL ® 300) or a partly etherified melamine/formaldehyde resin (MADURIT ® MW 815) as crosslinking agents. The dried antistatic coating had a content of crosslinking agent of 5%.

Prior to being processed, the solutions were adjusted to a pH value of about 4.3 by means of citric acid.

After drying, clear coatings were obtained which adhered excellently to the polyester film. Further test results are summarized in Table 3 below.

TABLE 3

| Solution | Crosslinking Agent | Water Resistance | Tackiness Test | Surface Resistance (ohm) |
|---|---|---|---|---|
| Ia | CYMEL | subst. good | good | $1.1 \times 10^{11}$ |
|    | MADURIT | good | good | $1.5 \times 10^{12}$ |
| Ib | CYMEL | good | good | $3.2 \times 10^{11}$ |
|    | MADURIT | good | good | $2.9 \times 10^{12}$ |
| IIa | CYMEL | good | subst. good | $3.8 \times 10^{10}$ |
|    | MADURIT | good | good | $7.5 \times 10^{11}$ |
| IIb | CYMEL | good | good | $1.3 \times 10^{11}$ |
|    | MADURIT | good | good | $1.6 \times 10^{12}$ |
| IIIa | CYMEL | subst. good | good | $2.2 \times 10^{11}$ |
|    | MADURIT | good | good | $2.6 \times 10^{12}$ |
| IIIb | CYMEL | medium | good | $2.8 \times 10^{11}$ |
|    | MADURIT | good | good | $9.0 \times 10^{12}$ |

EXAMPLE 4

In the same manner as described in Example 1, antistatic coatings were prepared from solutions having the following compositions:

Basic solution, solids content 10%:
233 g of deionized water,
60 g of isopropyl alcohol,
67 g of copolyester dispersion (30% strength) of AQ 55,
40 g of 50% strength dispersion of polymethylmethacrylate.

25 g batches of this basic solution were each mixed with 3 g of a 5% strength aqueous solution of an antistatic agent. The resulting dried coatings showed good adhesion to the polyester film. They had a content of antistatic agent of 6%. The test results are shown in Table 4 below.

TABLE 4

| Antistatic Agent | Water Resistance | Tackiness Test | Surface Resistance (ohm) |
|---|---|---|---|
| none | good | poor | $>10^{14}$ |
| (1) | substantially good | good | $3.2 \times 10^{10}$ |
| (6) | substantially good | good | $4.6 \times 10^{11}$ |
| (2) | good | good | $1.0 \times 10^{10}$ |
| (4) | substantially good | good | $1.1 \times 10^{10}$ |

EXAMPLE 5

100 μm thick film was coated with antistatic coatings as described in Example 1. Stock solutions II and III of Example 2 were employed as basic solutions.

These solutions were mixed with 10% strength solutions of a: (2) and b: (4). The coatings were adjusted to contents of antistatic agents of 6%, 10% and 14%. The coatings thus obtained were clear and adhered well to the film. The test results are summarized in Tables 5.1 and 5.2 below.

TABLE 5.1

| | Solution II with copolyester dispersion AQ 38 | | | | |
|---|---|---|---|---|---|
| Antistatic Agent | Added Amount (%) | Water Resistance | Tackiness Test | Surface Resistance (ohm) | |
| | | | | A | B+ |
| (2) | 0 | good | poor | $>10^{14}$ | — |
|     | 6 | good | subst. good | $1.2 \times 10^{10}$ | $1.3 \times 10^{11}$ |
|     | 10 | good | good | $7.0 \times 10^{9}$ | $1.5 \times 10^{11}$ |
|     | 14 | good | good | $7.5 \times 10^{9}$ | $1.0 \times 10^{11}$ |
| (4) | 6 | good | good | $1.4 \times 10^{10}$ | $1.7 \times 10^{11}$ |
|     | 10 | good | good | $7.5 \times 10^{9}$ | $6.5 \times 10^{10}$ |
|     | 14 | good | good | $4.2 \times 10^{9}$ | $2.8 \times 10^{10}$ |

TABLE 5.2

Solution III with copolyester dispersion AQ 55

| Antistatic Agent | Added Amount (%) | Water Resistance | Tackiness Test | Surface Resistance (ohm) A | B+ |
|---|---|---|---|---|---|
| (2) | 0 | good | good | $>10^{14}$ | — |
|  | 6 | good | good | $4.0 \times 10^{10}$ | $7.5 \times 10^{11}$ |
|  | 10 | good | good | $4.2 \times 10^{10}$ | $1.9 \times 10^{11}$ |
|  | 14 | good | good | $1.5 \times 10^{10}$ | $2.7 \times 10^{11}$ |
| (4) | 6 | good | good | $3.6 \times 10^{10}$ | $1.0 \times 10^{11}$ |
|  | 10 | good | good | $5.0 \times 10^{9}$ | $9.0 \times 10^{10}$ |
|  | 14 | subst. good | good | $1.5 \times 10^{10}$ | $6.5 \times 10^{10}$ |

+The surface resistance value B was measured after treatment of the sample with water.

To determine the surface resistance value after treatment with water, the samples were immersed into deionized water, then dried at room temperature and conditioned at a temperature of about 23° C. and 50% relative humidity for 24 hours. Thereafter, the surface resistance was measured as described in Example 1. Low differences between the original values and the values determined in this test indicate good water resistance of the antistatic coatings.

EXAMPLE 6

The rear surfaces of diazotype duplicating films comprising 125 µm thick polyethyleneterephthalate film as the base material were provided, in a continuously working coating device, with thin coatings of the following solutions:

Solution I:

118.7 g of copolyester dispersion (30% strength) of AQ 55,
189.7 g of deionized water,
53.6 g of isopropyl alcohol,
38.0 g of (2), 10% solution in water.

Solution II:

100.0 g of copolyester dispersion (30% strength) of AQ 55,
160.0 g of deionized water,
45.2 g of isopropyl alcohol,
32.0 g of (2), 10% strength solution in water,
36.6 g of hexamethoxymethylmelamine, 5% strength, in ethyl alcohol/water (1:1),
26.5 g of citric acid, 5% strength, in water.

Drying was performed within about 20 seconds by means of strongly circulating air at 120° C. The properties of the resulting coatings are compiled in Table 6 below:

TABLE 6

| Solution Employed | Adhesion | Water Resistance | Tackiness Test | Surface Resistance (ohm) A | B |
|---|---|---|---|---|---|
| none | — | — | good | $>10^{14}$ |  |
| I | good | subst. good | good | $2.8 \times 10^{9}$ | $4.8 \times 10^{10}$ |
| II | good | subst. good | good | $1.9 \times 10^{9}$ | $2.0 \times 10^{10}$ |

These three materials were furthermore evaluated with respect of their ease of handling by piling them up in stacks comprising sheets of 148 mm × 105 mm.

The individual sheets must not slip too much, and it must be possible to stack and destack them without difficulty. The sample prepared using solution II had the best result.

EXAMPLE 7

The rear surfaces of diazotype duplicating films comprising 125 µm thick polyethyleneterephthalate film as the base material were provided, in a continuously working coating device, with thin coatings of the following solutions:

Solution I:

100.2 g of copolyester dispersion (30% strength) of AQ 55,
134.3 g of deionized water,
53.7 g of isopropyl alcohol,
79.2 g of (4), 10% strength solution in water,
6.2 g of hexamethoxymethylmelamine, 5% strength, in ethyl alcohol/water (1:1),
26.4 g of citric acid, 5% strength, in water.

Solution II:

100.8 g of copolyester dispersion (30% strength), of AQ 55,
136.8 g of deionized water,
53.7 g of isopropyl alcohol,
79.2 g of (4), 10% strength solution in water,
3.1 g of hexamethoxymethylmelamine, 5% strength, in ethyl alcohol/water (1:1),
26.4 g of citric acid, 5% strength, in water.

Drying was performed within about 20 seconds by means of strongly circulating air at 120° C. The properties of the resulting coatings are compiled in Table 7 below:

TABLE 7

| Solution Employed | Adhesion | Water Resistance | Tackiness Test | Surface Resistance (ohm) A | B |
|---|---|---|---|---|---|
| none | — | — | good | $>10^{14}$ |  |
| I | good | subst. good | good | $5.5 \times 10^{9}$ | $3.2 \times 10^{10}$ |
| II | good | subst. good | good | $6.5 \times 10^{9}$ | $3.4 \times 10^{10}$ |

The handling test, performed with sheets of 148 mm × 105 mm, in accordance with the description given in Example 6, gave good reults in all three cases.

What is claimed is:

1. A biaxially stretch-oriented and heat-set polyester film having, on at least one surface, a coating comprising a copolyester, containing sulfonate groups, wherein said coating further comprises an antistatically effective amount of at least one salt derived from an amino acid or a protein hydrolysate.

2. A polyester film as claimed in claim 1, wherein said salt is an ammonium, alkali metal or triethanolamine salt.

3. A polyester film as claimed in claim 1, wherein the coating further comprises polymethylmethacrylate.

4. A polyester film as claimed in claim 1, wherein said coating contains about 5% to 25% by weight of the salt.

5. A polyester film as claimed in claim 1, wherein the film is comprised of polyethyleneterephthalate.

6. A polyester film as claimed in claim 1, wherein the salt comprises a salt of an N-acylsarcosine.

7. A polyester film as claimed in claim 6, wheren the acyl group of said N-acylsarcosine is a lauryl, cocoyl, stearyl or oleyl group.

8. A polyester film as claimed in claim 1, wherein the salt comprises a salt of an N-acyl derivative of a protein hydrolysate.

9. A polyester film as claimed in claim 8, wherein said protein hydrolsate is obtained from natural collagen and is condensed with a fatty acid.

10. A polyester film as claimed in claim 9, wherein said fatty acid is coconut fatty acid.

11. A polyester film as claimed in claim 1, further comprising a crosslinking agent contained in the coating.

12. A polyester film as claimed in claim 11, wherein the crosslinking agent comprises at least one, partly or completely etherified formaldehyde compound derived from urea or melamine.

13. A polyester film as claimed in claim 12, wherein the crosslinking agent comprises hexamethoxymethylmelamine.

* * * * *